United States Patent
Azuma et al.

(10) Patent No.: US 7,658,534 B2
(45) Date of Patent: Feb. 9, 2010

(54) LAMP HOLDING TOOL, LIGHTING DEVICE FOR DISPLAY DEVICE USING THE SAME, DISPLAY DEVICE USING THE SAME AND LIQUID CRYSTAL DISPLAY DEVICE USING LIGHTING DEVICE FOR DISPLAY DEVICE

(75) Inventors: Hiroki Azuma, Tsu (JP); Tatsuya Kudari, Suzuka (JP); Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/427,091

(22) Filed: Apr. 21, 2009

(65) Prior Publication Data
US 2009/0207587 A1 Aug. 20, 2009

Related U.S. Application Data

(63) Continuation of application No. 11/560,259, filed on Nov. 15, 2006, now Pat. No. 7,540,650, which is a continuation of application No. PCT/JP2005/020475, filed on Nov. 8, 2005.

(30) Foreign Application Priority Data
Nov. 30, 2004 (JP) .............................. 2004-347324

(51) Int. Cl.
*F21V 7/04* (2006.01)
(52) U.S. Cl. ................... 362/634; 362/97.1; 362/225; 349/58
(58) Field of Classification Search ............. 362/97.1, 362/97.2, 632–634, 225, 306, 561, 433, 217.1–217.17, 362/249.01, 249.04, 249.08; 349/58–60
See application file for complete search history.

(56) References Cited

U.S. PATENT DOCUMENTS 6,974,221 B2 * 12/2005 Wu et al. ..................... 362/29
7,137,726 B2 * 11/2006 Lee et al. ................... 362/632

(Continued)

OTHER PUBLICATIONS

Azuma et al.; "Lamp Holding Apparatus, Lighting Device for Display Device Including Same, Display Device Including Same and Liquid Crystal Display Device Including Lighting Device for Display Device"; U.S. Appl. No. 11/560,259, filed Nov. 15, 2006.

*Primary Examiner*—Bao Q Truong
(74) *Attorney, Agent, or Firm*—Keating & Bennett, LLP

(57) ABSTRACT

A lamp holding apparatus for mounting a lamp to a base member includes a mounting plate having a pair of locking portions protruding to a base side. The locking portion is inserted into a mounting hole provided at the base and capable of being locked to a peripheral edge on its back side. Abutting portions, which protrude to the base side and are capable of abutting the base at the time of mounting, are provided on a bottom surface of the mounting plate that is an opposing surface to the base. The abutting portions are provided at three spots with one of the locking portions interposed therebetween. At the time of mounting, each of the abutting portions abut the base, and the mounting plate is elastically deformed so as to be warped, whereby the locking surface of the locking portion is kept in the state in which it is locked to a peripheral edge of a back side of the mounting hole by its elastic force.

18 Claims, 16 Drawing Sheets

U.S. PATENT DOCUMENTS 7,167,219 B2 * 1/2007 Huang et al. ................... 349/60
7,270,467 B2 * 9/2007 Kim ........................... 362/634
7,461,958 B2 * 12/2008 Takata et al. ................ 362/433
7,510,317 B2 * 3/2009 Murakami et al. .......... 362/634
7,534,007 B2 * 5/2009 Lai et al. .................... 362/224
7,540,650 B2 * 6/2009 Azuma et al. ............... 362/634

* cited by examiner

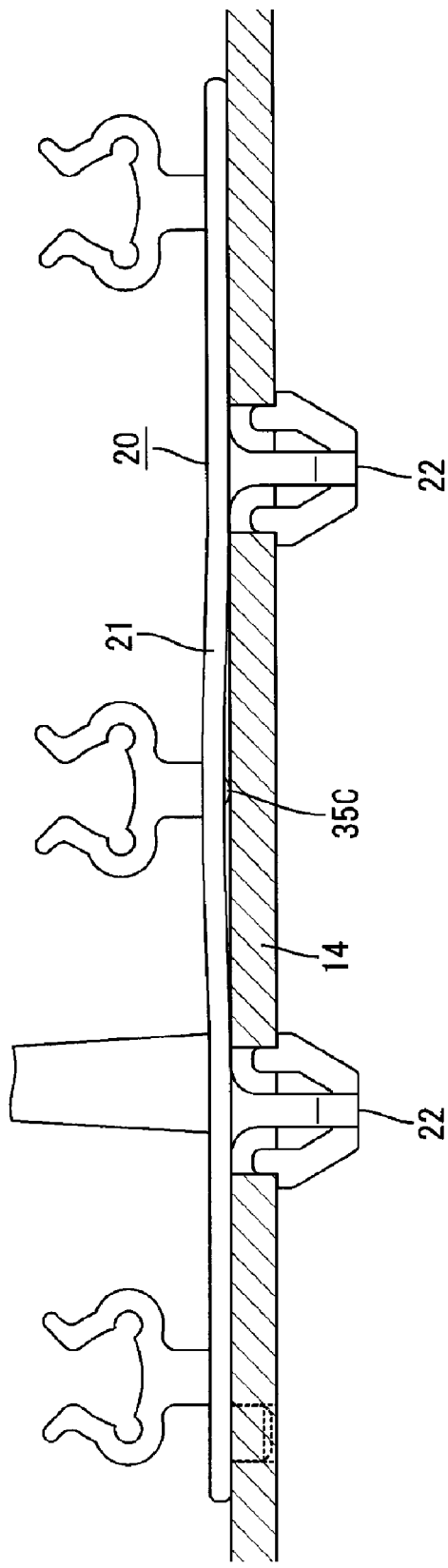

LAMP HOLDING TOOL, LIGHTING DEVICE FOR DISPLAY DEVICE USING THE SAME, DISPLAY DEVICE USING THE SAME AND LIQUID CRYSTAL DISPLAY DEVICE USING LIGHTING DEVICE FOR DISPLAY DEVICE

CROSS REFERENCE TO RELATED APPLICATION

This application claims priority from Japanese Patent Application No. 2004-347324 filed Nov. 30, 2004, the entire contents of which are hereby incorporated herein by reference.

BACKGROUND OF THE INVENTION

1. Field of the Invention

The present invention relates to a lamp holding apparatus, a lighting device for a display device including the lamp holding apparatus, a display device including the lighting device, and a liquid crystal display device including a lighting device for a display device.

2. Background of the Invention

Since a liquid crystal panel used in a liquid crystal display device of, for example, a liquid crystal television or the like is not self-luminous, it requires a separate backlight device as an external lamp. The backlight device is installed at a back side of the liquid crystal panel, and generally includes a base made of a metal with a surface on a liquid crystal panel side opened, a number of cold-cathode tubes accommodated in the base as lamps, and a number of optical members (diffusion sheet and the like) arranged on the opening portion of the base and efficiently releasing light emitted by the cold-cathode tubes to the liquid crystal panel side, and includes lamp clips for holding the cold-cathode tubes, which have a slim elongated tube shape, with respect to the base.

As one example of the lamp clip described above, the lamp clip disclosed in Japanese Patent Laid-Open No. 2001-210126 is known. This lamp clip is made of a synthetic resin, and includes a mounting plate arranged along an inner surface of a base, a locking portion which protrudes to a base side from the mounting plate and is inserted into a mounting hole of the base and is lockable to its peripheral edge, a lamp holding portion which protrudes to an opposite side from the locking portion from the mounting plate and is capable of holding a peripheral surface of a cold-cathode tube so as to surround it, and a pin which protrudes in the same direction as the lamp holding portion from the mounting plate. The pin protrudes to a larger extent than the lamp holding portion, and therefore, when the lamp clip is mounted to the base, an operator performs a mounting operation by gripping the pin.

Incidentally, the production of lamp clips can result in some variation in size that, due to an error in manufacture, cannot be avoided. In consideration of the error, the distance between the opposing surface to the base in the mounting plate and the opposing surface to the base in the locking projection is set to be a little larger than the plate thickness of the base, and therefore, it is possible that the mounted lamp clips rattle with respect to the base due to the clearance.

One option to reduce rattling is to include a locking portion. The locking portion is arranged to protrude at the mounting plate and the locking portion is inserted into a mounting hole formed in the base. The locking portion is designed to supplement an elastic force by further providing a projection facing to the base side to protrude at the mounting plate, and by elastically deforming the projection to compress the projection.

However, the elastic rebound force obtained by compression of the projection is extremely small, and therefore, even if such a projection is formed on the lamp holding apparatus, rattling of the lamp holding apparatus with respect to the base member cannot be sufficiently absorbed and prevented.

SUMMARY OF THE INVENTION

In order to overcome the problems described above, preferred embodiments of the present invention provide a lamp holding apparatus that is capable of preventing rattling with respect to the base member.

A lamp holding apparatus according to a preferred embodiment of the present invention is provided for mounting a lamp to a base member and includes a mounting plate applied to the base member, and a locking portion protruding to a base member side from the mounting plate and inserted into a mounting hole provided in the base member so as to be lockable to a peripheral edge of its back side, and includes an abutting portion which protrudes to the base member side and is capable of abutting the base member at a time of mounting, the abutting member being provided on the mounting plate on a surface that opposes the base member, in at least two spots with the locking portion therebetween, or in at least one spot between a plurality of locking portions.

With such a unique construction, when the lamp holding apparatus is mounted to the base member, the locking portion is inserted into the mounting hole and locked to the peripheral edge of its back side, and the abutting portion protruding from the mounting plate is caused to abut against the base member. In the lamp holding apparatus, a variation inevitably occurs in the size of each product due to an error in manufacture, and this causes the possibility that a clearance in accordance with a variation occurs between the mounting plate and the base member in the mounted state. However, according to preferred embodiments of the present invention, even if the above described clearance occurs, the abutting portion abuts the base member, whereby the mounting plate between the abutting portions elastically deforms to eliminate the clearance between the locking portion and the mounting hole.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 11B is a sectional front view showing a state in which the lamp clip according to another preferred embodiment of the present invention is mounted to a base.

DETAILED DESCRIPTION OF PREFERRED EMBODIMENTS

A preferred embodiment of the present invention will be described with reference to FIGS. 1 to 8. In this preferred embodiment, a lamp clip 20 used in a backlight device 12 of a liquid crystal display device 10 will be shown as an example. A vertical direction will be described with each of the drawings as the reference and a lateral direction will be described with FIG. 3 as the reference hereinafter.

Figure 1:
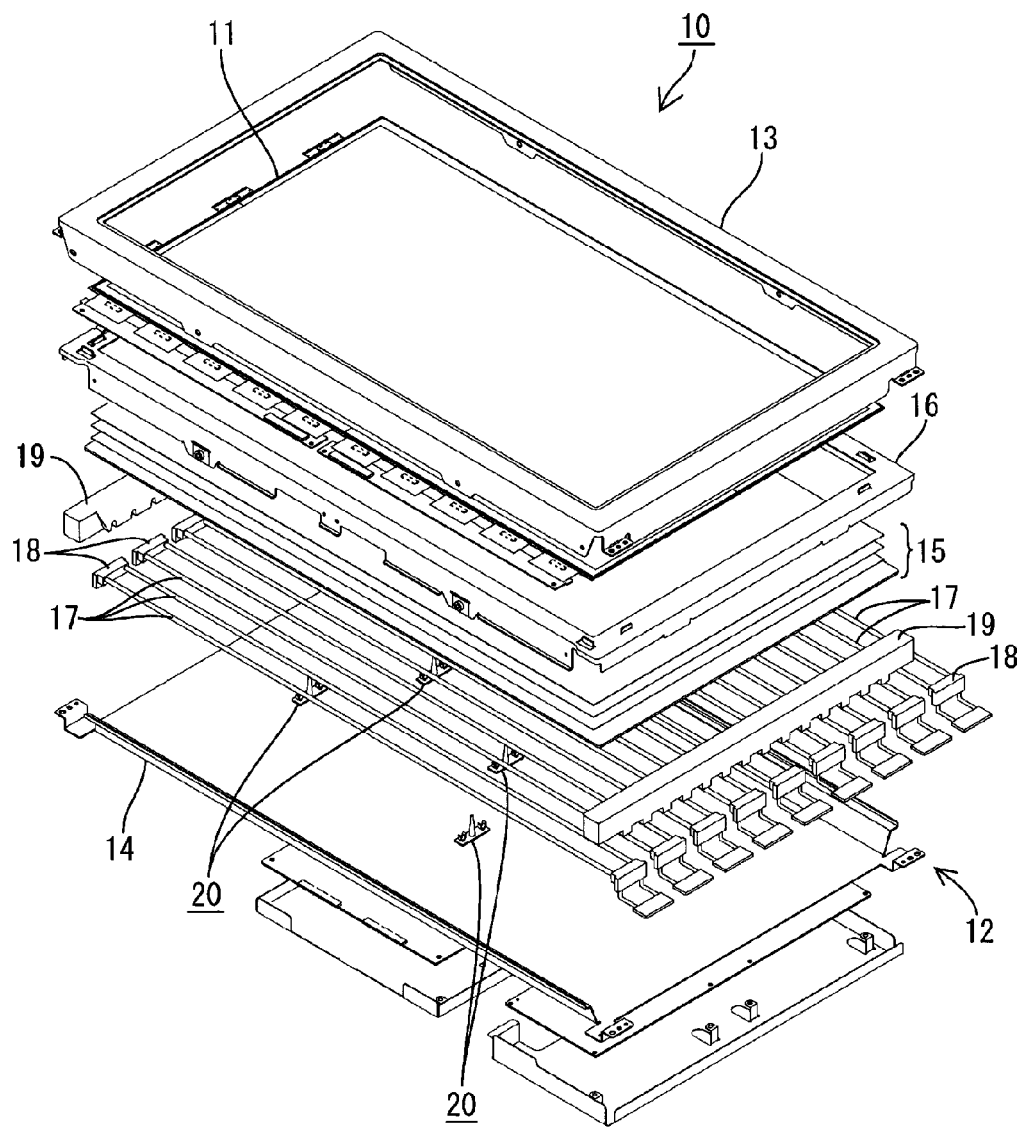
FIG. 1 is an exploded perspective view showing an outline of a liquid crystal display according to a preferred embodiment of the present invention.
Figure 2:
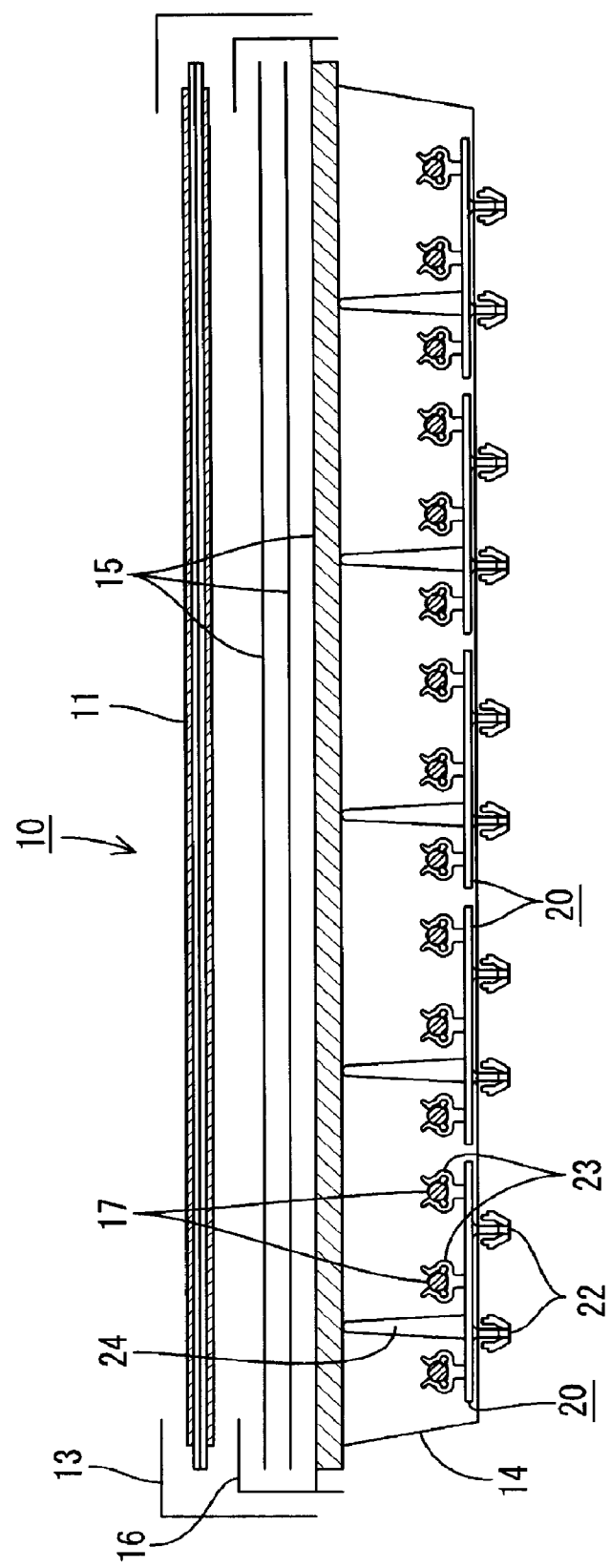
FIG. 2 is a sectional view showing an outline of the liquid crystal display device.

First, an outline of the entire liquid crystal display device 10 will be described. The liquid crystal display device 10 preferably generally includes a liquid crystal panel 11 having a substantially rectangular shape, and the backlight device 12 that is an external light source, and the liquid crystal panel 11 and the backlight device 12 are integrally held by a bezel 13 or the like, as shown in FIGS. 1 and 2. The liquid crystal panel 11 that is a display panel has a construction in which a pair of glass sheets are bonded to each other with a predetermined gap therebetween, and liquid crystal is sealed between both the glass sheets. One of the glass sheets is provided with switching elements (for example, TFT elements) connected to source wiring and gate wiring which are substantially perpendicular to each other and the other glass sheet is provided with pixel electrodes of R, G and B, respectively, arranged in a matrix configuration.

Next, the backlight device 12 will be described. The backlight device 12 preferably includes a metal base 14 preferably having a substantially rectangular box shaped configuration with a top surface side opened, a plurality of optical members 15 mounted to cover the opening of the base 14 (a diffusion plate, a diffusion sheet, a lens sheet and an optical sheet in the sequence from the lower side in the drawing), a frame 16 for holding these optical members 15 on the base 14, cold-cathode tubes 17 that are lamps accommodated in the base 14, a rubber (for example, silicon rubber) holder 18 for holding both end portions of the cold-cathode tubes 17, lamp holders 19 that collectively cover the cold-cathode tube 17 group and the holder 18 group, and lamp clips 20 for holding intermediate portions except for both end portions in the cold-cathode tubes 17.

The cold-cathode tube 17 preferably has a slim elongated shape, and a number of cold-cathode tubes 17 are accommodated in the base 14 in the state in which their length direction (axial direction) coincides with the long side direction of the base 14 and a plurality of the cold-cathode tubes 17 are arranged substantially parallel to each other. The outside diameter dimension of the cold-cathode tube 17 is preferably about 3 mm to about 4 mm, for example, but it sometimes increases and decreases in the tolerance range due to an error in manufacture or as desired.

The lamp clip 20, which is preferably made of a synthetic resin (for example, polycarbonate), includes a mounting plate 21 applied to a wall surface of a bottom portion of the base 14. Lamp clip 20 also includes locking portions 22, lamp holding portions 23, a pin 24 and the like. A plurality of the lamp clips 20 are mounted to the base 14 so as to be able to hold each of the cold-cathode tubes 17 preferably at two spots or three spots differing in the length direction. The surface of the entire lamp clip 20 is preferably colored to be white, for example, so as to make it difficult to shield and reflect the light emitted from the cold-cathode tube 17.

Figure 3:
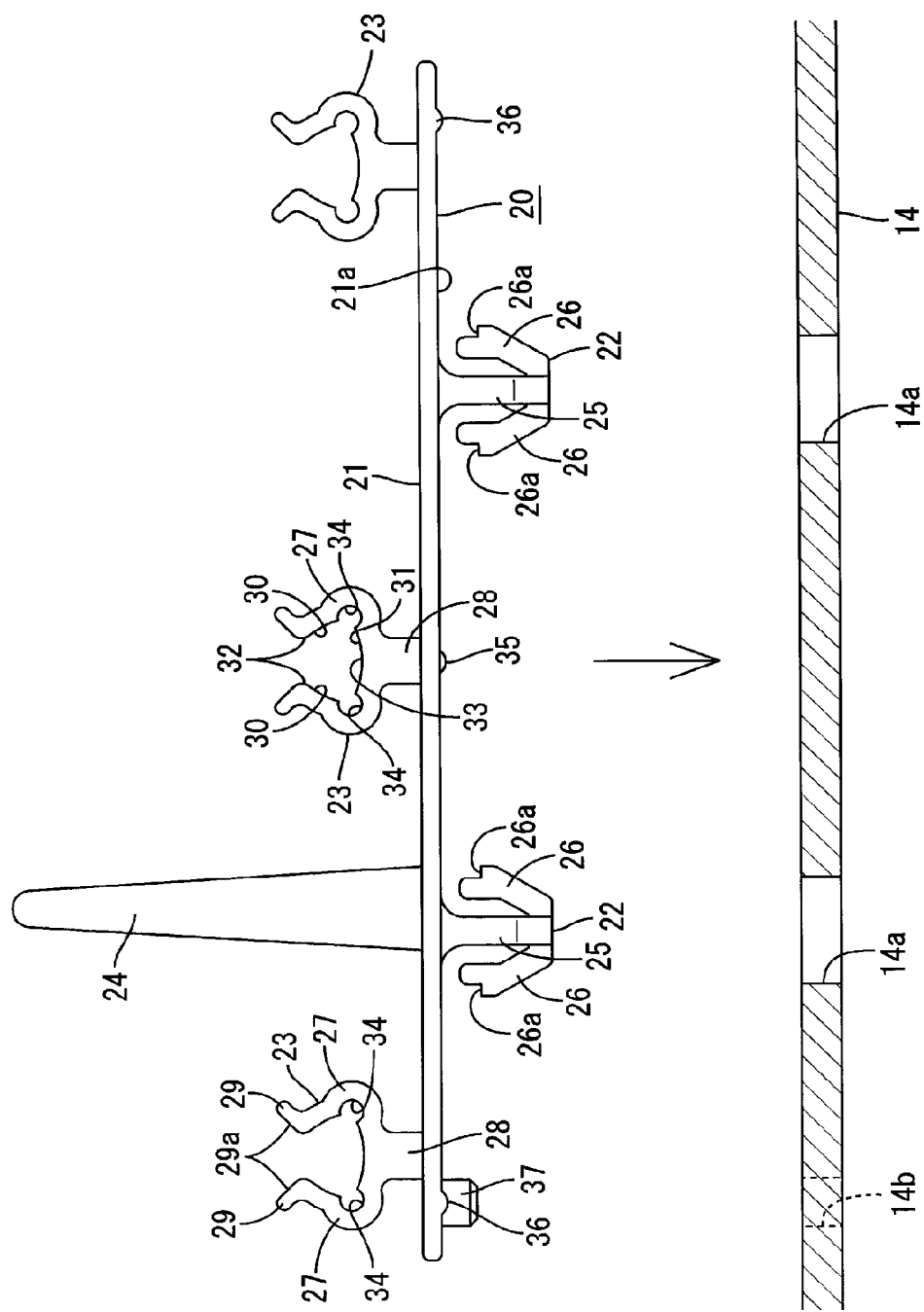
FIG. 3 is a sectional front view showing a state before a lamp clip is mounted to a base.
Figure 5:
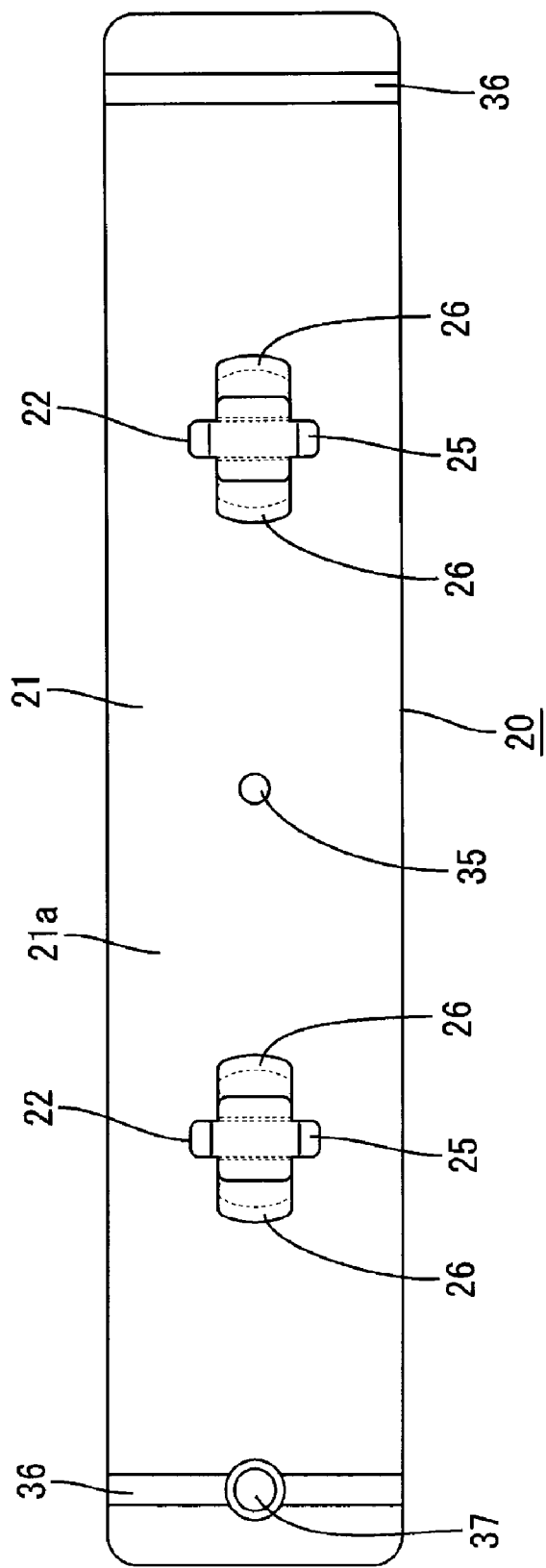
FIG. 5 is a bottom view of the lamp clip.
Figure 6:
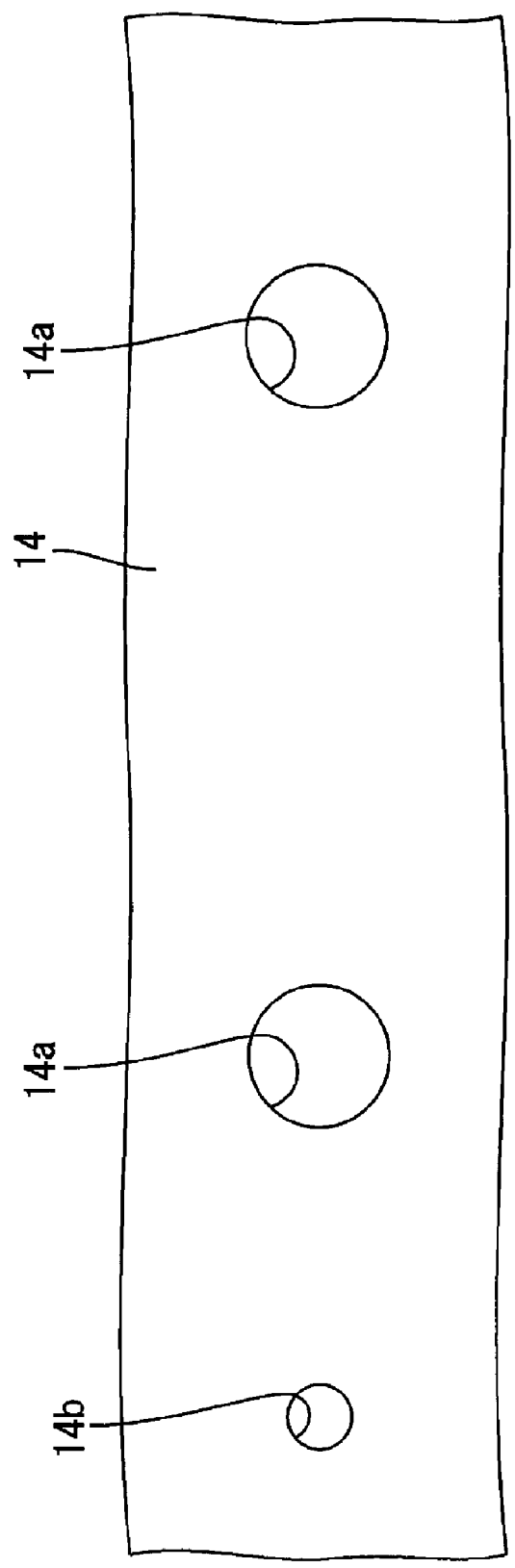
FIG. 6 is a partial plan view of a base.

The mounting plate 21 preferably has a substantially rectangular slim elongated shape extending along the short side direction of the base 14 (direction that is substantially perpendicular to the length direction of the cold-tube cathode 17). The locking portion 22 for fixing the lamp clip 20 to the base 14 is provided at a bottom surface 21a (the opposing surface to the base 14, the surface attached to base 14) of the mounting plate 21 so as to protrude downward (base 14 side) as shown in FIG. 3. A pair of locking portions 22 are provided at the mounting plate 21, and both the locking portions 22 are preferably arranged at the locations spaced substantially equidistantly from both end positions of the mounting plate 21 with respect to the long side direction of the mounting plate 21, and are both arranged at central positions with respect to the short side direction of the mounting plate 21, as shown in FIGS. 3 and 5.

Figure 8:
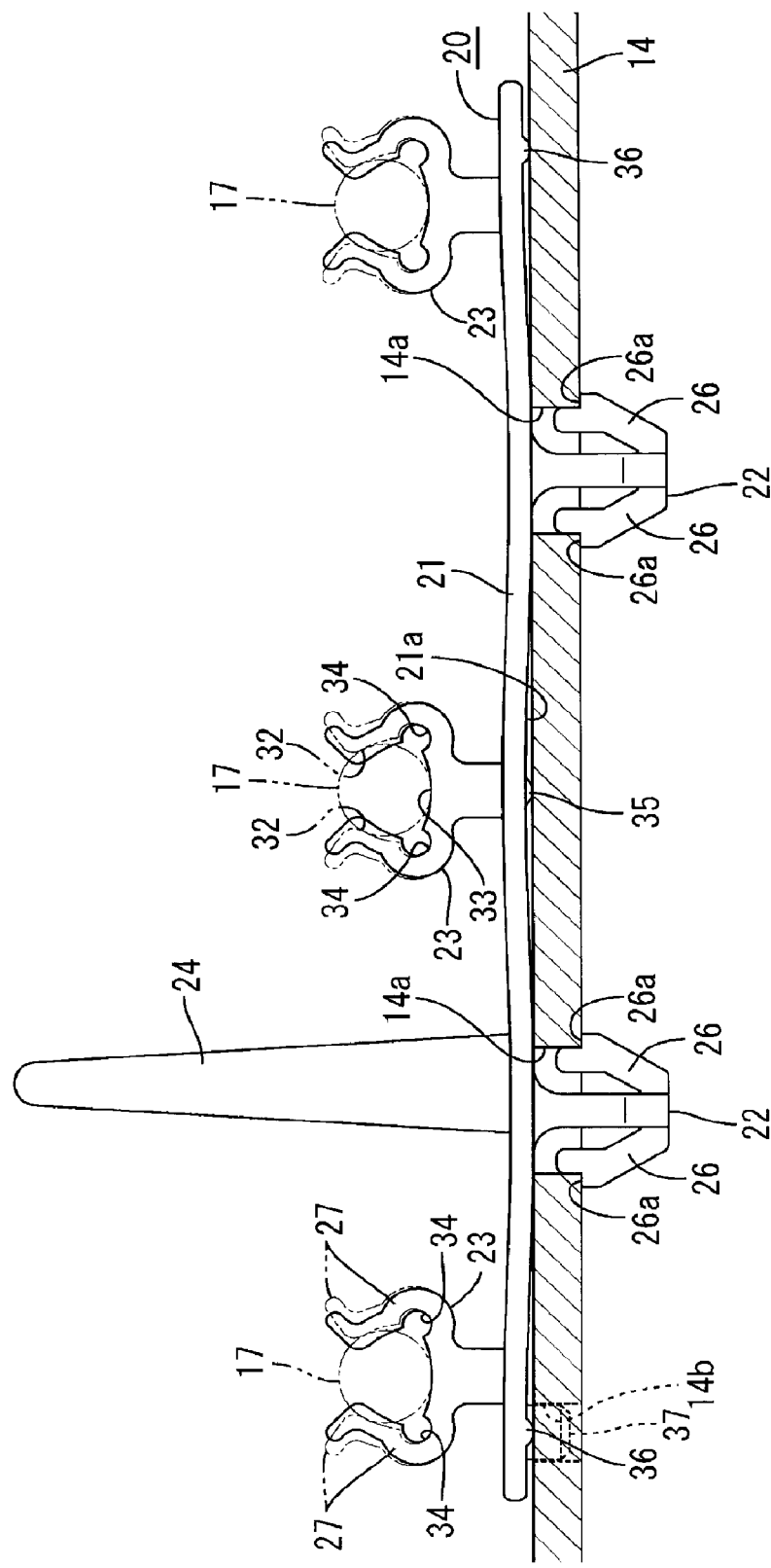
FIG. 8 is a sectional front view showing a state in which the lamp clip is mounted to the base.

The locking portion 22 preferably includes a base portion 25 arranged to hang from the bottom surface 21a of the mounting plate 21, and a pair of elastic locking pieces 26 extending diagonally upward from a tip end portion of the base portion 25 (to the mounting plate 21 side while separating from the base portion 25). The base portion 25 preferably has a substantially rectangular elongated slim shape extending along the short side direction of the mounting plate 21 (FIG. 5). The elastic locking pieces 26 are each preferably has an open sided shape connected to both side surfaces at the side of a long side in the tip end portion of the base portion 25, and are elastically deformable along the direction to contact and separate from the base portion 25 with their connecting portions as the support points. The locking portion 22 is capable of being inserted into each mounting hole 14a which is provided at the corresponding position in the base 14 so as to penetrate through it. Further, a step portion formed at the tip end portion in the elastic locking piece 26 is capable of being locked to the peripheral edge at the back side in the mounting hole 14a, and this becomes a locking surface 26a that is locked to the base 14 (FIG. 8).

The locking surface 26a of the elastic locking piece 26 and the bottom surface 21a of the mounting plate 21 are arranged to oppose each other when they are separated from each other as shown in FIG. 3, and a distance between both the surfaces 21a and 26a is preferably a little larger than the plate thickness dimension of the base 14 in consideration of an error in manufacture of the lamp clip 20. In detail, the distance between both the surfaces 21a and 26a increases and decreases within the tolerance range due to an error in manufacture of the lamp clip 20, but by setting it as described above, the distance between the surfaces 21a and 26a becomes about the same as the plate thickness dimension of the base 14. Thus, mounting to the base 14 is allowed even when the distance between both the surfaces 21a and 26a is at the minimum value of the tolerance range.

Figure 4:
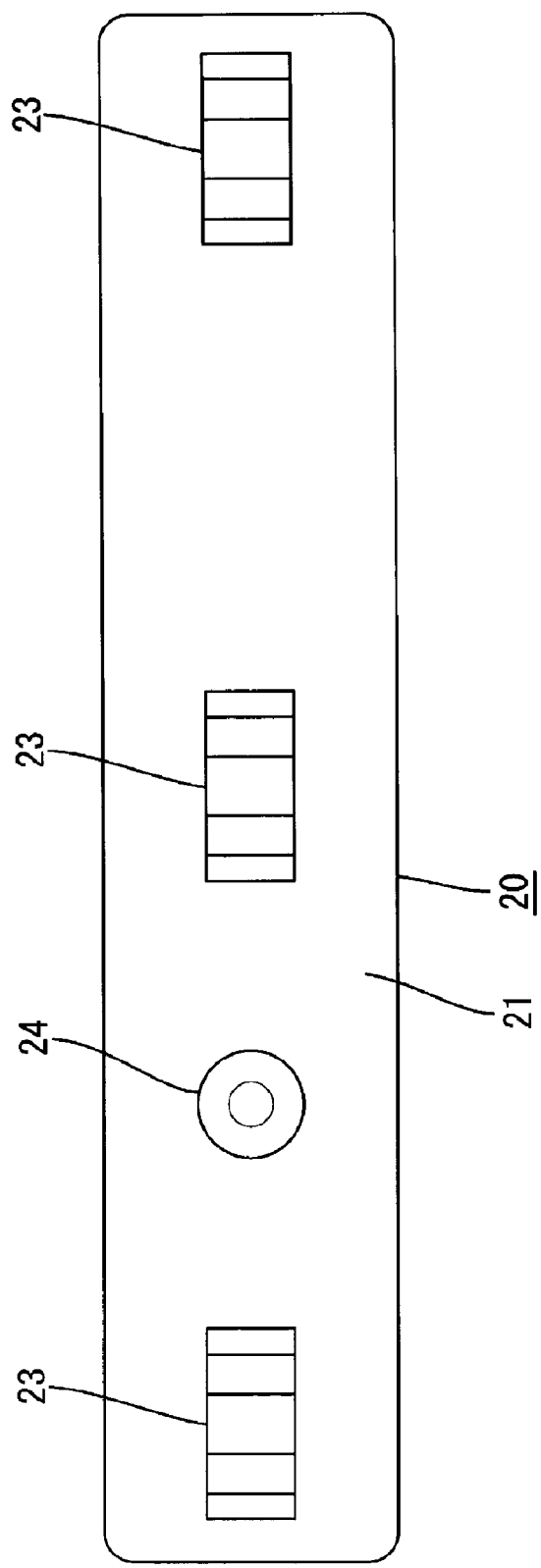
FIG. 4 is a plan view of the lamp clip.

On the top surface of the mounting plate 21 (opposing surface to the cold-cathode tube 17, a surface at the opening side of the base 14), a lamp holding portion 23 for holding the intermediate portion of the cold-cathode tube 17 except for both end portions in the length direction is arranged to protrude upward. Three lamp holding portions 23 in total, for example, are preferably provided at positions which are spaced substantially equidistantly from both end positions in the long side direction of the mounting plate 21 (in detail, positions near an outside from the locking portions 22) and at a substantially central position, as shown in FIGS. 3 and 4. Each of the lamp holding portions 23 is preferably located at a central position with respect to the short side direction of the mounting plate 21.

The lamp holding portion 23 is capable of surrounding the peripheral surface of the cold-cathode tube 17 as a whole as shown in FIG. 2, and preferably has a bottomed annular shape, which is opened upward to allow attachment and detachment of the cold-cathode tube 17. In detail, as shown in FIG. 3, the lamp holding portion 23 includes a pair of arm portions 27 connected at root portions of each other, and has the construction in which both arm portions 27 are connected to a connecting portion 28 vertically extending from the top surface of the mounting plate 21 so as to be able to hold the cold-cathode tube 17 at a position raised by a predetermined height from the mounting plate 21. Both the arm portions 27 preferably have open-sided shapes in which root portions protrude outside along a substantially horizontal direction (opposite side from each other), and thereafter, extending diagonally upward to an inside (in a direction close to each other), and are symmetrical in shape with each other. In both the arm portions 27, the space between the tip end portions is a space which is narrower than the minimum outside diameter dimension of the tolerance range in the cold-cathode tube 17. Through this clearance, attachment and detachment of the cold-cathode tube 17 are allowed, and both the arm portions 27 are capable of elastically deforming to open (elastically deformable while expanding the clearance between the tip end portions) with attachment and detachment.

Guide portions 29 protruding diagonally upward to an outside and separate from each other are respectively provided at outer surfaces of the tip end portions of both the arm portions 27. The inner surfaces of both the guide portions 29 define guide surfaces 29a, each preferably having a tapering shape, and a distance between both the guide surfaces 29a becomes gradually large as they extend upward. Namely, acceptance width for the cold-cathode tube 17 in the lamp holding portion 23 gradually increases toward a front side in the mounting direction, and therefore, mounting of the cold-cathode tube 17 is facilitated. Both the guide surfaces 29a are formed to define a substantially right angle with each other.

Inner peripheral surfaces of both the arm portions 27 include three gentle arc surfaces 30 and 31 which are formed at a root portion and in the vicinity of both tip end portions, and when virtual tangential lines of the respective arc surfaces 30 and 31 are connected, an equilateral triangle is formed. The respective arc surfaces 30 and 31 are preferably gentler than a peripheral surface of the cold-cathode tube 17, and in other words, curvatures of the respective arc surfaces 30 and 31 are preferably smaller than the curvature of the peripheral surface of the cold-cathode tube 17. Among the respective arc surfaces 30 and 31, both the arc surfaces 30 at the tip end side of both the arm portions 27, the tip end portions are made point contact portions 32, which are point-contactable to the cold-cathode tube 17 with respect to the circumferential direction. As for the arc surface 31 at the root side, its central portion is made a point contact portion 33, which is point-contactable to the cold-cathode tube 17 with respect to the circumferential direction. Both the point contact portions 32 at the tip end sides of both the arm portions 27 make it possible to press the cold-cathode tube 17 from above or from the removing direction of cold-cathode tube 17. The arc surface 31 of the root portions of both the arm portions 27 have a configuration such that a central portion in its circumferential direction is the deepest, and therefore, it is made possible to guide the cold-cathode tube 17 to be mounted to the central position. In the mounting state, each of the point contact portions 32 and 33 is located at the vertex point of the isosceles triangle or the equilateral triangle though it differs depending on the thickness of the cold-cathode tube 17 (see FIG. 8). A connecting portion of the arc surface 30 at the tip end side in the arm portion 27 and the above described guide surface 29a preferably has a substantially round shape.

In the lamp holding portion 23, both the arm portions 27 elastically deform to open a little in the mounting state and the respective point contact portions 32 and 33 are arranged to be able to contact firmly to the peripheral surface of the cold-cathode tube 17, which allows for holding it without rattling, even when the thickness of the cold-cathode tube 17 to be mounted is at the minimum value in the tolerance range.

Recessed portions 34 are preferably provided at the inner peripheral surfaces (opposing surfaces to the cold-cathode tube 17) in both the arm portions 27. In detail, the recessed portion 34 is placed between the adjacent arc surfaces 30 and 31 (between the tip end portion and the root portion of the arm portion 27, namely, the connecting region with respect to the connecting portion 28) of the inner peripheral surface of the arm portion 27, and is formed into an arc shape more acutely than the respective arc surfaces 30 and 31 (with a relatively large curvature, with a relatively small radius of curvature). The recessed portion 34 extends over the entire width of the arm portion 27, and is preferably deeper toward a central portion in the circumferential direction. An outer peripheral surface of the arm portion 27 at the recessed portion 34 is provided (the surface at the opposite side from the opposing surface to the cold-cathode tube 17) is formed to bulge outwardly by the amount by which the arm portion 27 is recessed by the recessed portion 34. In other words, in the direction separate from the cold-cathode tube 17, whereby the arm portion 27 is formed to have substantially uniform thickness over substantially the entire length. The arm portion 27 is allowed to bend to deform to open with the region at the root side of the portion where the recessed portion 34 is provided as the support point, namely, so that the tip end portion displaces in the direction separate from the peripheral surface of the cold-cathode tube 17. Thereby, opposed to a situation where the recessed part is not provided, the operational force required to deform the arm portion 27 to open is reduced. Further, in the arm portion 27, a total surface distance (arm length) from the root portion to the tip end portion (being a free) end becomes large as a result of the portion provided with the recessed portion 34 bulging outwardly.

On the top surface of the mounting plate 21, a pin 24 capable of abutting the optical member 15 is arranged to protrude upward (the same direction as the lamp holding portion 23) as shown in FIG. 3. The pin 24 preferably has a substantially conical shape (tapering shape) with a rounded tip end, so as to be able to support the optical member 15 by the tip end portion. The height dimension of the pin 24 is larger than the lamp holding portion 23, and is set at, for example, about three times as large as the lamp holding portion 23, and therefore, when the lamp clip 20 is mounted to the base 14, an operator can perform the operation by gripping the pin 24. The pin 24 is disposed at an intermediate position between the left end lamp holding portion 23 and the central lamp holding portion 23 and at the position corresponding to the back side of the locking portion 22 as shown in FIGS. 3 and 4, and is arranged to overlap a part of the locking portion 22 with respect to the surface direction of the mounting plate 21.

On the bottom surface 21a (opposing surface to the base 14) of the mounting plate 21, abutting portions 35 and 36 are capable of abutting the top surface (opposing surface to the mounting plate 21) of the base 14 at the time of mounting is arranged to protrude downward (the base 14 side) as shown in FIG. 3. The abutting portions 35 and 36 are preferably provided at three spots that are in a central position in the long side direction in the mounting plate 21, and in the vicinities of both end positions. The abutting portions 35 and 36 are preferably bow-shaped in sectional shape, in other words, a shape having an arc-shaped outer surface which bulges the most at a central portion with respect to the long side direction of the mounting plate 21. The respective abutting portions 35 and 36 are located at positions with the locking portions 22 therebetween, respectively, and in more detail, the central abutting portion 35 and the abutting portion 36 at the left end are placed at two positions with the locking portion 22 at the left side therebetween, and the central abutting portion 35 and the abutting portion 36 at the right end are placed at two positions with the locking portion 22 at the right side therebetween.

Among them, the central abutting portion 35 is also located at the central position with respect to the short side direction in the mounting plate 21, and preferably has a substantially spherical crown shape capable of being in point contact with the base 14, as shown in FIGS. 3 and 5. The abutting portion 35 is disposed at the intermediate position between the two locking portions 22 arranged at the left and right in the bottom surface 21a of the mounting plate 21. The abutting portion 35 is located on the back side of the lamp holding portion 23 at the center on the top surface side, and is disposed at the concentric position with the lamp holding portion 23.

Meanwhile, the abutting portions 36 at both ends each preferably has an embossed shape extending in the short side direction of the mounting plate 21, and are capable of being in line contact with the base 14 with respect to the same direction. Both the abutting portions 36 have the same length over the entire width of the mounting plate 21. Both the abutting portions 36 are placed at positions near the ends from the lamp holding portions 23 at both ends in the mounting plate 21 and at positions that are substantially equidistantly spaced from both end positions of the mounting plate 21. On the bottom surface 21a of the mounting plate 21, the respective abutting portions 35 and 36 are preferably disposed at substantially symmetrical positions and have substantially symmetrical shapes.

A protruding amount of each of the abutting portions 35 and 36 from the mounting plate 21 is substantially the same and is set based on an error occurring in manufacturing the lamp clip 20. Specifically, due to an error in manufacture, a variation occurs in the distance between the locking surface 26a in the locking portion 22 and the bottom surface 21a of the mounting plate 21 for each product within the tolerance range. The protruding amount of each of the abutting portions 35 and 36 is preferably slightly larger than a value obtained by subtracting the plate thickness dimension of the base 14 from the maximum value of the tolerance range of the above described distance, i.e., the maximum value of the clearance occurring between the mounting plate 21 and the base 14. Accordingly, the distance between the locking surface 26a of the locking portion 22 and the bottom surface 21a of the mounting plate 21 can be any value within the tolerance range when the lamp clip 20 is mounted to the base 14, each of the abutting portions 35 and 36 abuts the top surface of the base 14, and the mounting plate 21 is elastically deformed to be warped with the portions provided with the respective abutting portions 35 and 36 as the support points.

As shown in FIGS. 3 and 5, a positioning pin 37 capable of being fitted into a positioning hole 14b provided at the base 14 is provided preferably at a central position in the length direction in the abutting portion 36 at the left end. As is already described, while the locking portions 22 and the abutting portions 35 and 36 provided on the back surface side (the opposing surface side to the base 14) of the lamp clip 20 are symmetrically disposed, the lamp holding portions 23 and the pin 24 on the front surface side are disposed asymmetrically, and therefore, it may appear that the lamp clip 20 is mistakenly mounted to the base 14 in the inverted direction. However, the positioning pin 37 is fitted into the positioning hole 14b when the mounting plate 21 is in the correct direction when mounting the lamp clip 20 to the base 14, but when the mounting plate 21 is in the inverted direction, it is mismatched with the positioning hole 14b to be able to restrict mounting, and therefore, erroneous mounting can be prevented.

The present preferred embodiment has the above-described unique structure, and its operation will be described subsequently. While the liquid crystal panel 11 is manufactured, an assembling operation of the backlight device 12 is performed. When assembling the backlight device 12, the operation of mounting each of the lamp clips 20 to the base 14 is performed first.

The pin 24 of the lamp clip 20 is gripped in the state shown in FIG. 3, and while each of the locking portions 22 is matched to each of the mounting holes 14a of the base 14 and the positioning pin 37 is matched to the positioning hole 14b, respectively, the mounting plate 21 is pressed against the top surface of the base 14. Then, each of the locking portions 22 is inserted into each of the corresponding mounting holes 14a, and the positioning pin 37 is fitted into the positioning hole 14b. In the process in which the locking portion 22 is inserted into the mounting hole 14a, both the elastic locking pieces 26 are locked to the peripheral edge of the front side of the mounting hole 14a, and thereby, they are elastically deformed to be temporarily close to the base portion 25.

Figure 7:
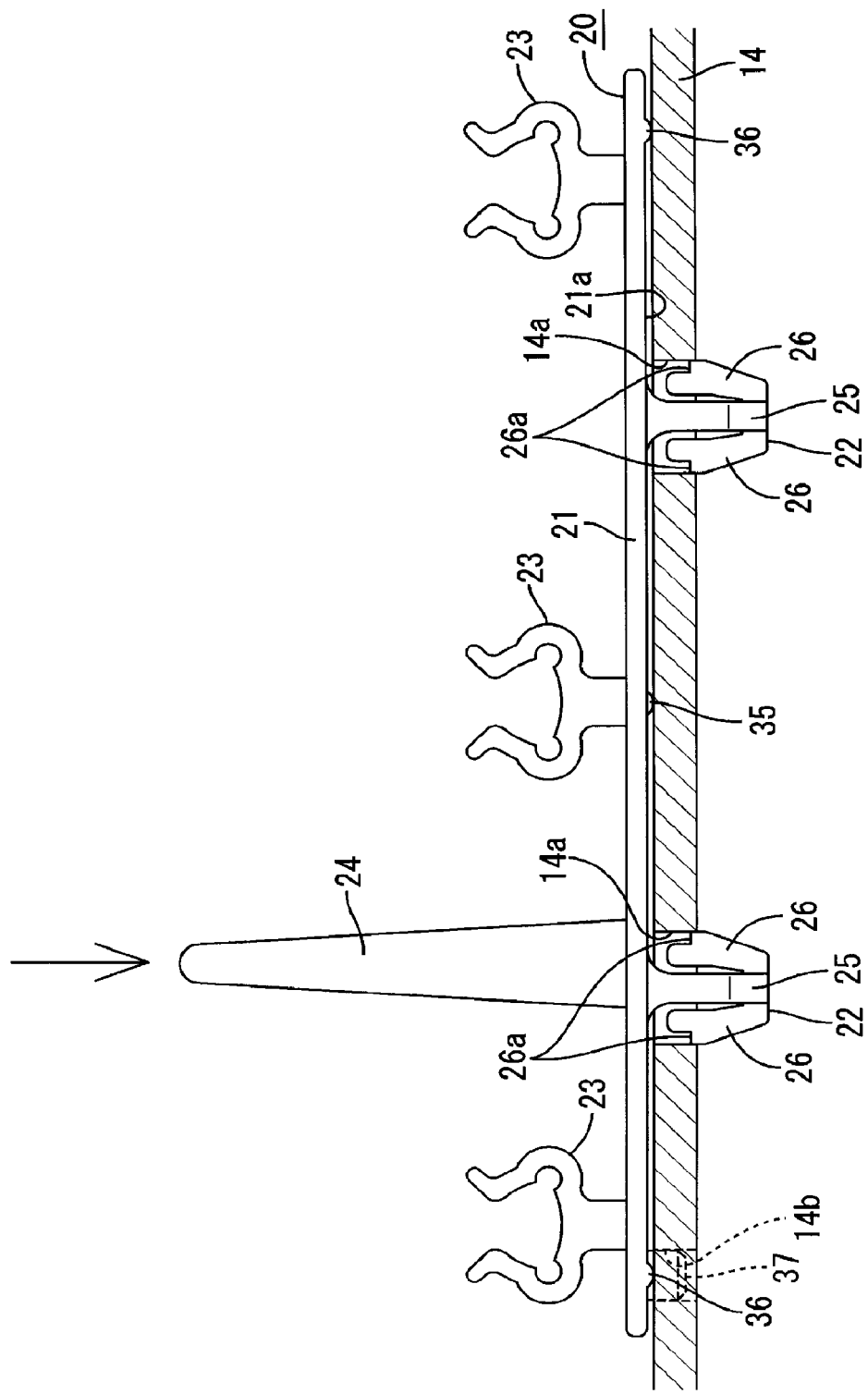
FIG. 7 is a sectional front view showing a state during mounting of the lamp clip to the base.

Then, when the mounting plate 21 is pushed into a predetermined depth, each of the abutting portions 35 and 36 abut the top surface of the base 14 as shown in FIG. 7. In this state, both the elastic locking pieces 26 remain to be elastically deformed, and the mounting plate 21 is at the position slightly raised from the base 14 to provide a clearance corresponding to the protruding amount of the abutting portions 35 and 36 between both the base 14 and the mounting plate 21. Then, when the mounting plate 21 is further pushed in, the mounting plate 21 is restricted from displacing in the pushing direction by the base 14 with respect to the portion where each of the abutting portions 35 and 36 is provided, and therefore, the portions sandwiched by the restricting regions are elastically deformed to be warped into the bow shape with the restricting regions as the support points. When the locking surfaces 26a of both the elastic locking pieces 26 reach the back side of the base 14, the elastic locking pieces 26 restore as shown in FIG. 8, and the locking surfaces 26a are locked to the peripheral edge of the back side of the mounting hole 14a. At this time, the base 14 is held by being sandwiched between the bottom surface 21a of the mounting plate 21 and the locking surface 26a of the elastic locking piece 26.

In this state, while the portion provided with each of the abutting portions 35 and 36 of the mounting plate 21 is supported at the position raised from the base 14, the portions provided with the locking portions 22 are elastically deformed to be warped to be close to the base 14 side, and therefore, both the locking portions 22 are elastically biased upward respectively, in the detaching direction. Accordingly, the locking surface 26a of each of the elastic locking pieces 26 is kept in close contact with the peripheral edge of the back side of the mounting hole 14a in the base 14 by the elastic force of the mounting plate 21, whereby the lamp clip 20 is held in the mounted state to the base 14 without rattling up and down. The protruding amount of each of the abutting portions 35 and 36 is preferably larger than the maximum value of the clearance occurring between the mounting plate 21 and the base 14 due to an error in manufacture of the lamp clip 20, and therefore, even if the distance between the locking surface 26a of the elastic locking piece 26 and the bottom surface 21a of the mounting plate 21 varies to any value in the tolerance range due to an error occurring during manufacturing the lamp clip 20, a warping degree (deformation amount) of the mounting plate 21 changes more or less, but each of the abutting portions 35 and 36 abuts the top surface of the base 14 and the mounting plate 21 elastically deforms to be warped without fail, whereby occurrence of rattling to the lamp clip 20 can be reliably prevented irrespective of an error in manufacture.

In this mounted state, both the abutting portions 36 provided at both ends of the mounting plate 21 are in line contact with the top surface of the base 14 with respect to the short side direction of the mounting plate 21. Accordingly, the mounting plate 21 is mounted in the state partially raised from the base 14 by each of the abutting portions 35 and 36, but the raised portion of the mounting plate 21 can be prevented from rattling (displacing) to be inclined with respect to the short side direction by the clearance occurring in a space from the base 14.

After each of the lamp clips 20 is mounted to the base 14, the operation of mounting the cold-cathode tube 17 is subsequently performed. The cold-cathode tube 17 is held by the lamp clip 20 in the state in which two of them are made one set by attaching the holders 18 at both end portions thereof as shown in FIG. 1.

When the cold-cathode tube 17 is pushed downward while being guided by both the guide portions 29 of the lamp holding portion 23 and while being guided by both guide portions 29 of the lamp holding portion 23, both the arm portions 27 elastically deform to open with the root side regions in the portions where the recessed portions 34 are provided as the support points, and the clearance between both the tip end portions is widened, whereby entry of the cold-cathode tube 17 is allowed. Then, when the cold-cathode tube 17 passes between the tip end portions of both the arm portions 27, both the arm portions 27 close to predetermined positions and each of the point contact portions 32 and 33 contacts the peripheral surface of the cold-cathode tube 17, whereby the cold-cathode tube 17 is supported at three points. Although the thickness of the cold-cathode tube 17 increases and decreases within the tolerance range due to an error in manufacture, the recessed portions 34 are provided at the opposing surfaces to the cold-cathode tube 17 in both the arm portions 27, and therefore, an elastic force occurring to both the arm portion 27 is reduced. Accordingly, the relatively slim cold-cathode tube 17 can be held without rattling, the operation force required for attaching and detaching the relatively thick cold-cathode tube 17 can be reduced, and it is made difficult for the cold-cathode tube 17 to be pushed out to the detaching direction by the elastic force of the arm portion 27 in the held state, and thus, favorable operability and holding performance can be obtained.

After all the cold-cathode tubes 17 are mounted as described above, the lamp holder 19 is mounted, and the optical member 15 and the frame 16 are assembled to the base 14 in this sequence, whereby the backlight device 12 is provided. By integrally assembling the backlight device 12 and the liquid crystal panel 11 using the bezel 13, the liquid crystal display device 10 is provided (see FIG. 1).

As described above, according to this preferred embodiment, the abutting portions 35 and 36 which protrude to the base 14 side and are capable of abutting the base 14 at the time of being mounted are provided preferably at three spots with the respective locking portions 22 therebetween, of the bottom surface 21a that is the opposing surface to the base 14 in the mounting plate 21, and the protruding amounts are set so that the abutting portions 35 an 36 abut the base 14 to cause warping in the mounting plate 21 even when a clearance occurs between the mounting plate 21 and the base 14 due to an error in manufacture of the lamp clip 20, and therefore, the mounting plate 21 can be caused to generate an elastic force. Thereby, the locking portion 22 can be kept in the state locked to the peripheral edge of the back side of the mounting hole 14a, whereby rattling can be prevented from occurring between the locking portion 22 and the base 14.

A pair of abutting portions 36 are placed at both end positions in the long side direction in the mounting plate 21 having a substantially rectangular shape, and therefore, occurrence of rattling to the mounting plate 21 can be reliably prevented.

Since both the abutting portions 36 are arranged to be capable of being in line contact with the base 14 with respect to the short side direction in the mounting plate 21, occurrence of rattling can be prevented more reliably as compared with the lamp clip in which the abutting portion is caused to be in point contact with the base.

Since the lamp clip 20 is preferably made of a synthetic resin, manufacture is facilitated, and reduction in cost can be achieved.

Since the front surface of the lamp clip 20 is preferably white, it hardly happens that the lamp clip 20 itself shields and reflects the light emitted from the cold-cathode tube 17 as compared with the case where the lamp clip is made black. Thereby, when the cold-cathode tube 17 is lit to cause the liquid crystal display device 10 to display, it is difficult for the pin 24 to be visually recognized by a viewer (reduction in luminance or the like is prevented), and therefore, display performance of the liquid crystal display device 10 becomes favorable.

The present invention is not limited to the preferred embodiment described via the aforementioned description and drawings, and, for example, the following preferred embodiments and modifications thereto are also included in the technical scope of the present invention.

Figure 9:
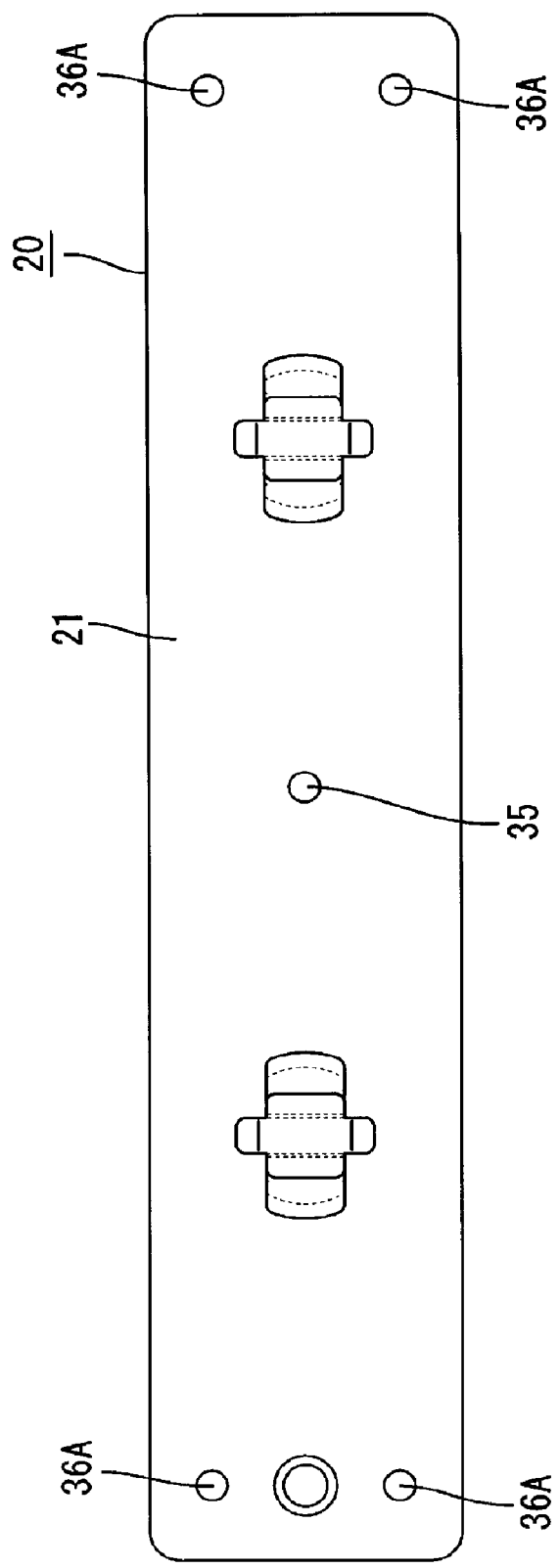
FIG. 9 is a bottom view showing a lamp clip according to another preferred embodiment of the present invention.

The above described preferred embodiment shows the case where the abutting portions 36 at both ends in the mounting plate 21 have a configuration in line contact with the base 14, but as shown in, for example, FIG. 9, an abutting portion 36A capable of being in point contact with the base 14 may be provided at both ends of the mounting plate 21. Since the abutting portions 36A are disposed at two spots spaced from each other along the short side direction of the mounting plate 21 respectively at both end portions of the mounting plate 21 (four abutting portions 36A in total), the mounting plate 21 can be prevented from rattling to incline with respect to the short side direction with respect to the base 14. The abutting portion 36A preferably has the same shape as the central abutting portion 35 in FIG. 9, but it is possible to change each of the shapes.

Figure 10:
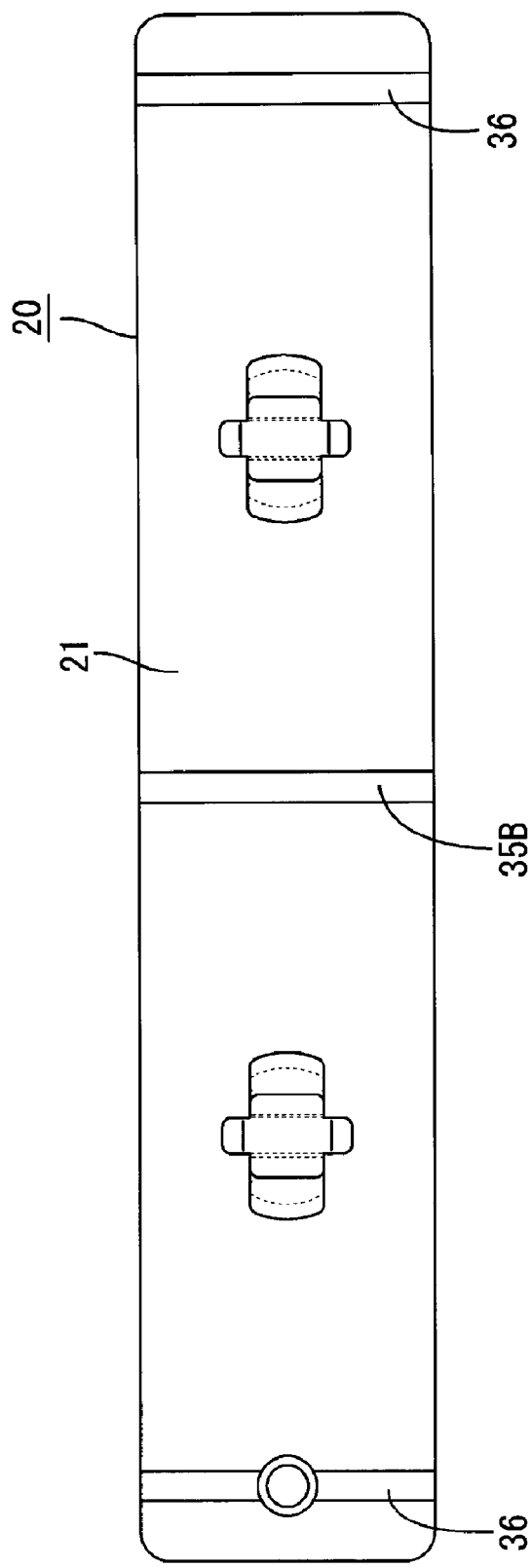
FIG. 10 is a bottom view showing a lamp clip according to another preferred embodiment of the present invention.

The above described preferred embodiment shows the case where the central abutting portion 35 of the mounting plate 21 has a configuration that is in point contact with the base 14, but as shown in FIG. 10, for example, the abutting portion 35B is extended along the short side direction of the mounting plate 21 so as to be in line contact with the base 14 with respect to the same direction. The abutting portion 35B preferably has substantially the same shape as the abutting portions 36 at both ends in FIG. 10, but may be suitably changeable.

Figure 11A:
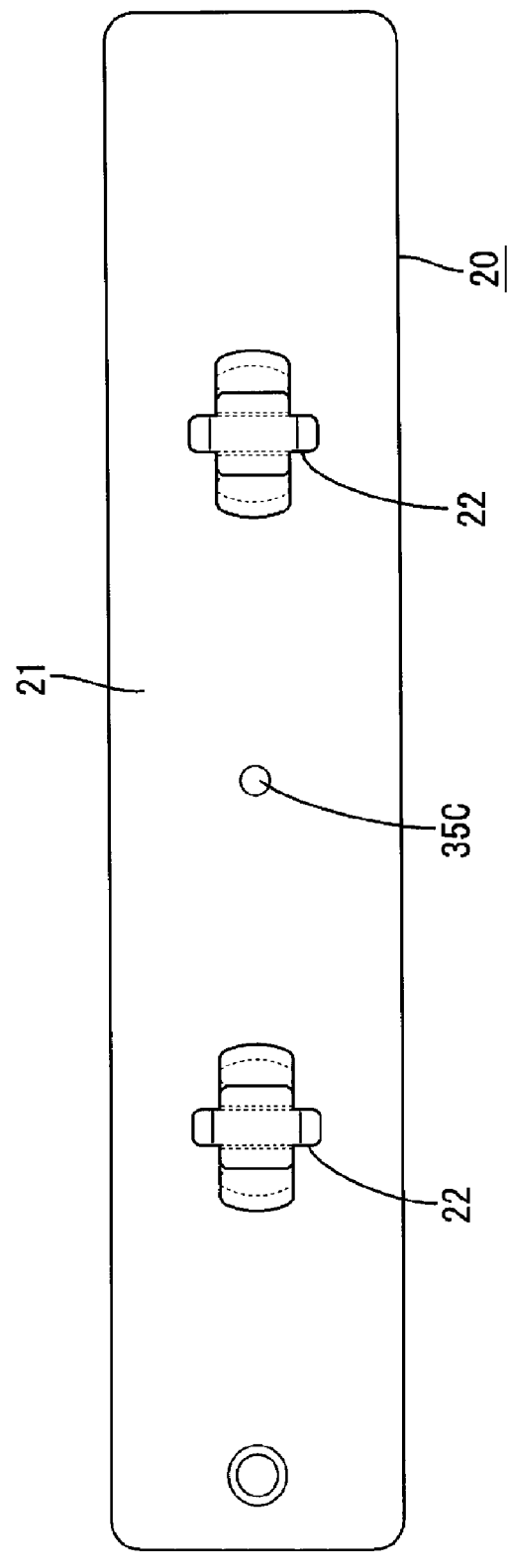
FIG. 11A is a bottom view showing a lamp clip according to another preferred embodiment of the present invention.

The above described preferred embodiment shows the case preferably includes the abutting portions 35 and 36 provided at three spots of the mounting plate 21, but as shown in FIG. 11A, for example, only one abutting portion 35C may be provided at a central position in the long side direction of the mounting plate, between the two locking portions 22. In this case, warping can be caused to the mounting plate 21 with the abutting portion 35C as the support point as shown in FIG. 11B. In FIGS. 11A and 11B, the abutting portion 35C in point contact with the base 14 is shown, but the abutting portion in the mode in line contact with the mounting plate 21 with respect to the short side direction may be adopted.

Figure 12A:
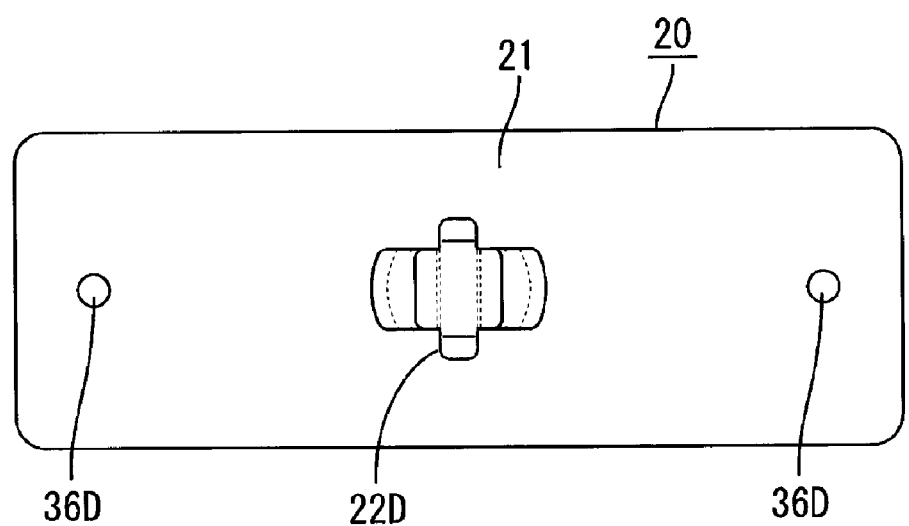
FIG. 12A is a bottom view showing a lamp clip according to another preferred embodiment of the present invention.
Figure 12B:
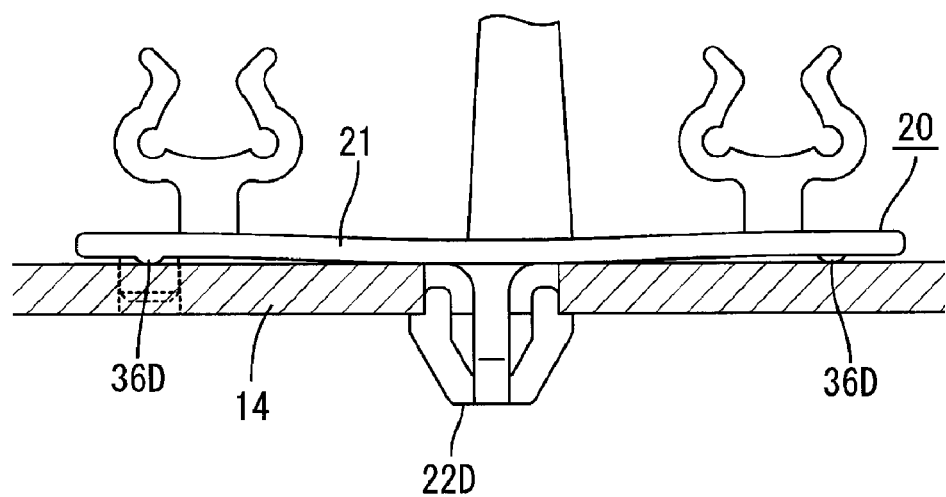
FIG. 12B is a sectional front view showing a state in which the lamp clip according to another preferred embodiment of the present invention is mounted to a base.

The above described preferred embodiment shows the lamp clip 20 including the two locking portions 22 as an example, but as shown in FIG. 12A, for example, in the lamp clip 20 including only one locking portion 22D, abutting portions 36D may be respectively provided at two spots with the locking portion 22D therebetween. In this case, as shown in FIG. 12B, the mounting plate 21 can be caused to generate warping with both the abutting portions 36D as the support point. In FIGS. 12A and 12B, the abutting portions 36D are in point contact with the base 14 as shown, but the abutting portion in the mode in line contact with the mounting plate 21 with respect to the short side direction may be adopted.

Figure 13A:
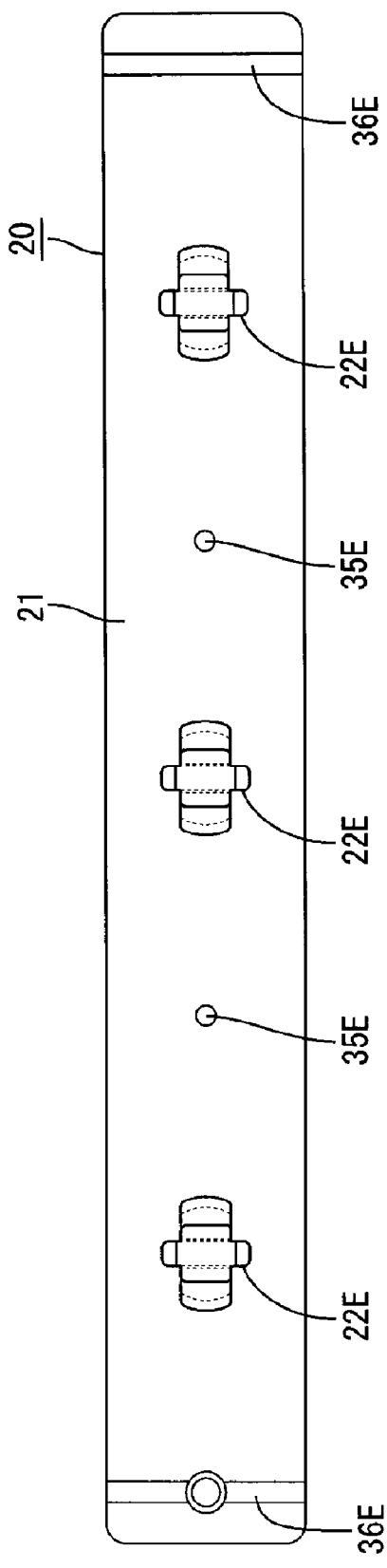
FIG. 13A is a bottom view showing a lamp clip according to another preferred embodiment of the present invention.
Figure 13B:
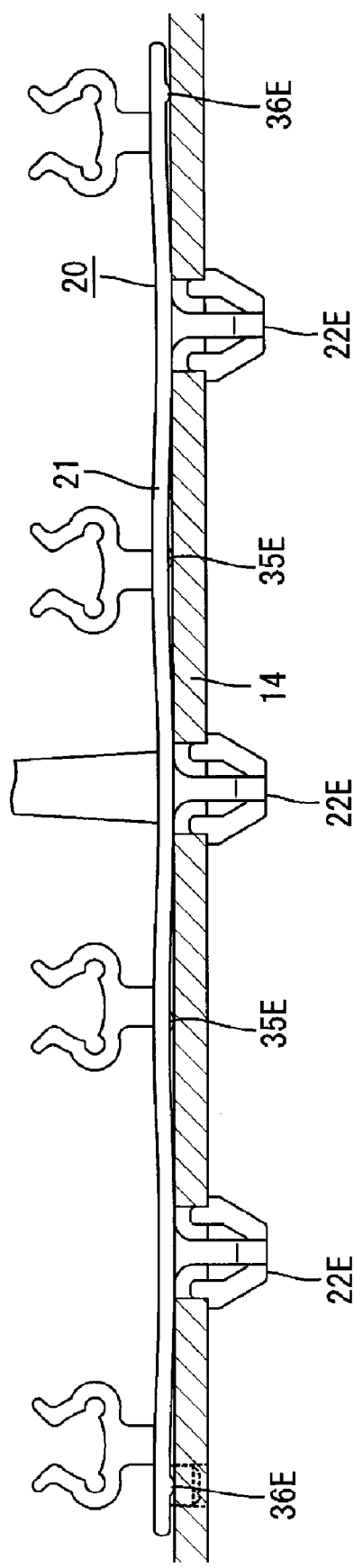
FIG. 13B is a sectional front view showing a state in which the lamp clip according to another preferred embodiment of the present invention is mounted to a base.

In the above described preferred embodiment, the lamp clip 20 including the two locking portions 22 is shown as an example, but as shown in FIG. 13A, for example, in the lamp clip 20 including three locking portions 22E, abutting portions 35E may be provided at two spots each interposed between the locking portions 22E, and abutting portions 36E may be provided at two spots in both end positions in the long side direction of the mounting plate 21. In this case, as shown in FIG. 13B, the mounting plate 21 can be caused to generate warping with the abutting portions 35E and 36E as the support points. In FIGS. 13A and 13B, the mode in which the abutting portion 35E is in point contact with the base 14 is adopted, but the mode in which the abutting portion 35E is in line contact with the mounting plate 21 with respect to the short side direction may be adopted, or on the other hand the abutting portion 36E is in point contact with the base 14 may be adopted. Further, it is possible to omit any of the abutting portions 35E and 36E if only the mounting plate 21 can be caused to generate warping.

The present invention is applicable to a lamp clip including four or more locking portions.

The above described preferred embodiments preferably includes protruding amounts of the abutting portions 35 and 36 from the mounting plate 21 that are larger than the maximum value of the clearance occurring between the mounting plate 21 and the base 14, but it is possible to set the protruding amounts of the abutting portion to be about the same as the maximum value of the clearance occurring between the mounting plate 21 and the base 14, for example. In this case, rattling of the mounting plate 21 can be also prevented by the abutting portion abutting the base 14.

The diameter dimension of the abutting portion 35 and the line width/line length of the abutting portion 36 or the like can be changed, and the shape of the abutting portions 35 and 36 is changeable without being limited to the substantially spherical crown shape and the embossed shape described above.

The arrangement positions of the respective abutting portions 35 and 36 in the mounting plate 21 can be changed. The arrangement positions do not have to be symmetrical with respect to the back surface side of the mounting plate, and may be changed to be asymmetrical.

The mode of the locking portion 22 may be the mode in which the locking projections are bulged sidewards from the tip end portion of the base portion vertically provided from the mounting plate as shown in the prior art, for example, and is changeable in the other respects. The shape of the mounting plate 21 is not limited to the substantially rectangular shape, and the mounting plates having a substantially square shape and a substantially circular shape are included in the present invention.

The above described preferred embodiment preferably uses the cold-cathode tube 17 as a lamp, but modes using the other kinds of lamps such as a hot-cathode tube, for example, are included in the present invention.

The above described preferred embodiment shows the backlight device 12 in which the lamp clip 20 is mounted to the substantially box-shaped base 14, but a mode in which the lamp clip 20 is mounted to the planar base from which a peripheral wall is removed, for example, is also included in the present invention.

The above described preferred embodiment includes the lamp clip 20 being white, but the lamp clip 20 may be made colorless and transparent, or semitransparent and semi-opaque. In doing so, the lamp clip 20 easily transmits light emitted from the cold-cathode tube 17, and it becomes more difficult that light is shielded and reflected. Thereby, when the cold-cathode tube 17 is lit to cause the liquid crystal display device 10 to display, it is difficult for the pin 24 to be visually recognized by a viewer (reduction in luminance or the like is prevented), and therefore, the display performance of the liquid crystal display device 10 becomes more favorable. As for the color of the lamp clip 20, the colors except for the above described color are also included in the present invention.

The above described preferred embodiment includes the lamp clip 20 being made of a synthetic resin material and polycarbonate, but a synthetic resin material other than this may be used. As the material of the lamp clip 20, it is possible to use the other kinds of materials without being limited to the synthetic resin material. When the synthetic resin material other than polycarbonate and the material other than the synthetic material are used, the color of the lamp clip 20 can be made any of white, colorless and transparent, and semitransparent and semi-opaque.

The present invention is also applicable to the liquid crystal display device using a switching element other than the TFT. The present invention is also applicable to the liquid crystal display device performing black and white display other than the liquid crystal display device which provides a color display.

The above described preferred embodiment discloses using the present invention with a liquid crystal display device, but the present invention is also applicable to the other display devices, for example, devices that use a backlight device other than liquid crystal devices.

While preferred embodiments of the present invention have been described above, it is to be understood that variations and modifications will be apparent to those skilled in the art without departing the scope and spirit of the present inven-

What is claimed is:

1. A backlight lamp holding apparatus for mounting a plurality of lamps to a base member, said backlight lamp holding apparatus comprising:

a resilient planar mounting plate that is to be mounted to said base member at a first surface of said mounting plate and that includes a plurality of abutting portions protruding from said first surface of said mounting plate;

a locking portion including a base portion protruding from said first surface of said mounting plate, and an elastic locking piece extending from a tip end of said base portion; and a plurality of lamp holding portions that protrude from a second surface of said mounting plate and are adapted for holding said plurality of lamps, respectively; wherein said locking portion is arranged at substantially a center between adjacent abutting portions and at substantially a center between adjacent lamp holding portions;

said elastic locking piece includes a locking surface that is locked to a peripheral edge of a mounting hole formed through said base member when said locking portion is inserted into said mounting hole from a top side of said base member so that said locking surface reaches a back side of said base member;

said plurality of abutting portions are arranged to abut against a top surface of said base member, without extending through said base member, to prevent rattling between said base member and said mounting plate, when said mounting plate is mounted to said base member; and a protruding amount of each of said adjacent abutting portions is such that said locking surface is located within said mounting hole when said adjacent abutting portions first abut against said top surface of said base member during insertion of said locking portion into said mounting hole, and thereafter said locking surface is locked to the peripheral edge of said mounting hole when said locking portion is further pushed into said mounting hole with elastic deformation of at least portions of said mounting plate occurring between said locking portion and said adjacent abutting portions.

2. A backlight lamp holding apparatus as in claim 1, wherein said plurality of abutting portions are spaced away from said locking portion in a lateral direction along said first and second surfaces of said mounting plate.

3. A backlight lamp holding apparatus as in claim 1, wherein said plurality of abutting portions are arranged to apply a force against said base member in a direction that is opposite to a force applied to said base member by said locking portion.

4. A backlight lamp holding apparatus as in claim 1, further comprising:

an alignment pin arranged to ensure proper orientation of said mounting plate relative to said base member;

wherein said alignment pin is arranged to extend from said first surface of said mounting plate by a distance that is greater than a distance that said plurality of abutting portions extend from said first surface of said mounting plate.

5. A backlight lamp holding apparatus as in claim 1, wherein:

said mounting plate has a substantially rectangular shape; and at least two abutting portions of said plurality of abutting portions are located at respective end positions of said mounting plate so as to be spaced apart along a longitudinal direction of said mounting plate.

6. A backlight lamp holding apparatus as in claim 1, wherein:

said mounting plate has a substantially rectangular shape; and at least one abutting portion of said plurality of abutting portions is arranged to abut against said base member at least two positions spaced apart along a short side direction of said mounting plate.

7. A backlight lamp holding apparatus as in claim 1, wherein:

said mounting plate has a substantially rectangular shape; and at least one abutting portion of said plurality of abutting portions is arranged to be in line contact with said base member with a contact line along a short side direction of said mounting plate.

8. A backlight lamp holding apparatus as in claim 1, wherein said plurality of lamp holding portions are formed of a synthetic resin.

9. A backlight lamp holding apparatus as in claim 1, wherein said plurality of lamp holding portions have white surfaces.

10. A lighting device for a display device, comprising:

a backlight lamp holding apparatus as in claim 1; and said plurality of lamps.

11. A lighting device for a display device, as in claim 10, wherein:

said mounting plate has a substantially rectangular shape; and at least two abutting portions of said plurality of abutting portions are located at respective end positions of said mounting plate so as to be spaced apart along a longitudinal direction of said mounting plate.

12. A lighting device for a display device, as in claim 10, wherein:

said mounting plate has a substantially rectangular shape; and at least one abutting portion of said plurality of abutting portions is arranged to abut against said base member at least two positions spaced apart along a short side direction of said mounting plate.

13. A lighting device for a display device, as in claim 10, wherein:

said mounting plate has a substantially rectangular shape; and at least one abutting portion of said plurality of abutting portions is arranged to be in line contact with said base member with a contact line along a short side direction of said mounting plate.

14. A display device, comprising:

a lighting device for a display device, as in claim 10; and a display panel.

15. A display device as in claim 14, wherein:

said mounting plate has a substantially rectangular shape; and at least two abutting portions of said plurality of abutting portions are located at respective end positions of said mounting plate so as to be spaced apart along a longitudinal direction of said mounting plate.

16. A display device as in claim 14, wherein:
said mounting plate has a substantially rectangular shape; and
at least one abutting portion of said plurality of abutting portions is arranged to abut against said base member at least two positions spaced apart along a short side direction of said mounting plate.

17. A display device as in claim 14, wherein:
said mounting plate has a substantially rectangular shape; and
at least one abutting portion of said plurality of abutting portions is arranged to be in line contact with said base member with a contact line along a short side direction of said mounting plate.

18. A display device as in claim 14, wherein said display panel is a liquid crystal panel that including a liquid crystal material.

* * * * *